United States Patent [19]

Krohn

[11] Patent Number: 4,548,780

[45] Date of Patent: Oct. 22, 1985

[54] SENSING DEVICES FOR MOUNTING IN CHAMBER WALLS AND A METHOD OF MANUFACTURE

[75] Inventor: Rasmus A. R. Krohn, Morpeth, England

[73] Assignee: Elmwood Sensors Limited, Tyne and Wear, England

[21] Appl. No.: 341,958

[22] Filed: Jan. 22, 1982

[30] Foreign Application Priority Data

Jan. 27, 1981 [GB] United Kingdom ............... 8102409

[51] Int. Cl.⁴ .................. B29C 6/00; G01K 7/16
[52] U.S. Cl. .................. 264/272.15; 264/274; 264/275; 374/144
[58] Field of Search ............. 264/274, 272.11, 272.15, 264/272.16, 272.18, 275; 339/75 R, 75 M, 89 M, 182 R, 182 RS, 183, 14 R, 14 T, 96, 97 R, 97 L, 175 C, 175 T; 136/236 R, 230; 296/43; 362/362, 364, 368, 391; 374/144, 145, 183

[56] References Cited

U.S. PATENT DOCUMENTS

| | | | |
|---|---|---|---|
| 2,934,792 | 5/1960 | Harrington | 264/272.16 |
| 3,044,296 | 7/1962 | Boddy | 374/145 |
| 3,193,636 | 7/1965 | Daniels | 339/182 RS |
| 3,262,314 | 7/1966 | Gregg | 374/145 |
| 3,333,233 | 7/1965 | Kindersley | 339/182 R |
| 3,665,509 | 5/1972 | Elkins | 339/182 R |
| 3,668,779 | 6/1972 | Turner | 264/272.11 X |
| 3,960,604 | 6/1976 | Heitzinger | 136/236 R |
| 4,305,287 | 12/1981 | Böhm et al. | 374/144 |
| 4,339,488 | 7/1982 | Brokmann | 264/273 |

FOREIGN PATENT DOCUMENTS

| | | | |
|---|---|---|---|
| 52-40186 | 3/1977 | Japan | 374/145 |
| 2035553A | 6/1980 | United Kingdom . | |

OTHER PUBLICATIONS

"Two New Sensors for the Condition Monitoring of Marine Diesel Engines", ASEA Journal, 1978, vol. 51, No. 6, pp. 147-149.

Primary Examiner—Jay H. Woo
Assistant Examiner—James C. Housel
Attorney, Agent, or Firm—Salter & Michaelson

[57] ABSTRACT

A sensing device incorporating a sensing element and terminals for making electrical connection to the device is manufactured by placing the sensing element and the terminals in a mould and injection moulding a plastics body around them. The integral plastics body firmly bonds the parts of the device together and is shaped outwardly with a screw thread and a hexagonal nut portion—for example—so that the device can be screwed into a threaded aperture in a chamber wall. One application is a temperature indicator screwed into an automobile engine block.

12 Claims, 6 Drawing Figures

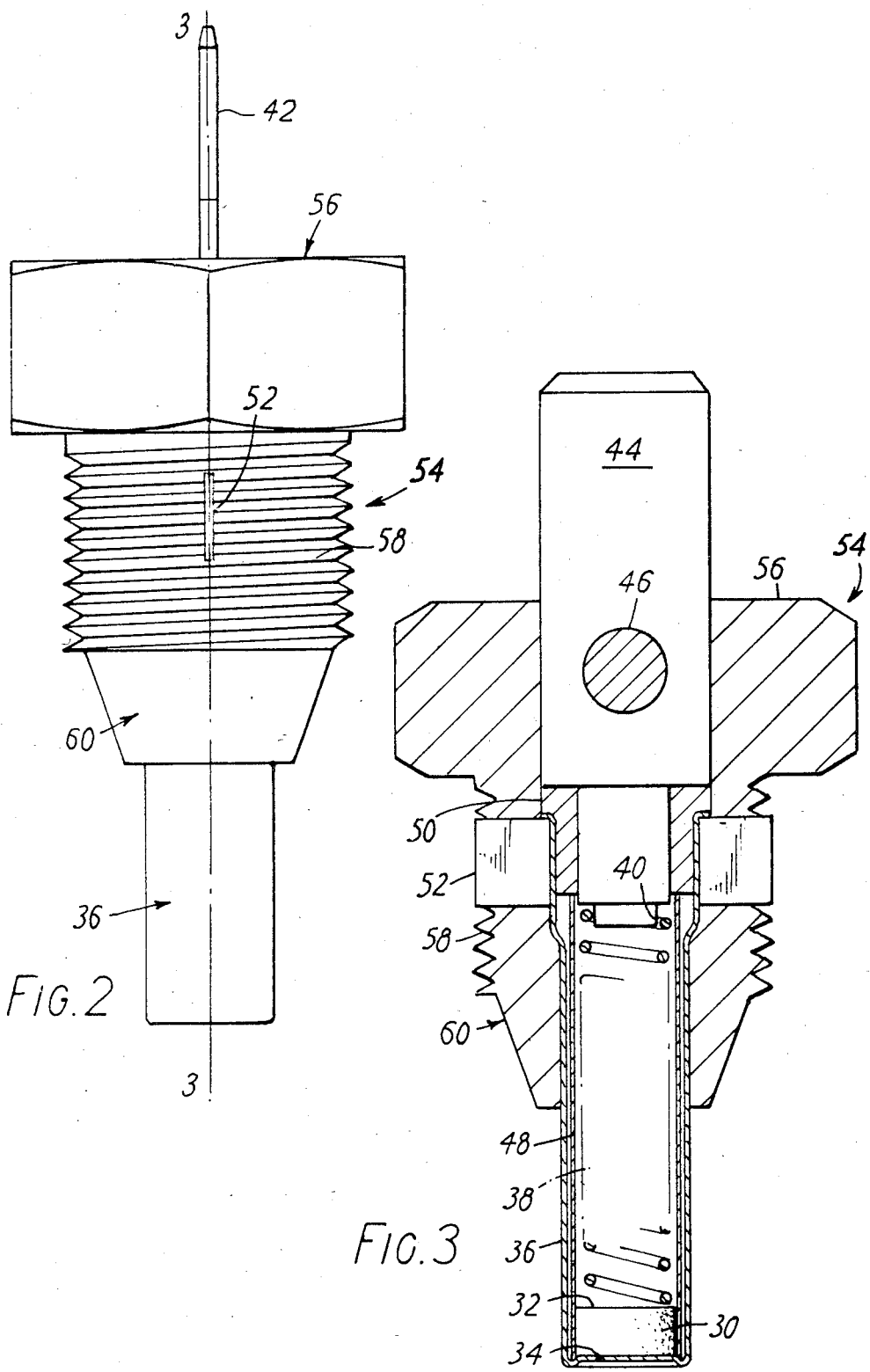

SENSING DEVICES FOR MOUNTING IN CHAMBER WALLS AND A METHOD OF MANUFACTURE

BACKGROUND AND SUMMARY OF THE INVENTION

This invention relates to sensing devices which are adapted to provide an electrical indication of a sensed parameter and, particularly, relates to sensing devices arranged for mounting in the wall of a chamber to provide at a terminal outside the chamber an electrical indication of a parameter sensed within the chamber.

In automobile engines increasing use is now made of devices for sensing temperatures and pressures in various regions, the outputs of these devices being used to drive a display or to control a particular engine function. Taking the example of temperature sensing devices, these may be electro-mechanical in nature—such as thermostats incorporating a bimetallic element—or electronic, examples of the latter being NTC devices. In both cases the conventional method of construction involves placing the sensor element in a brass housing and fitting an insulating cap to the housing with suitable O-ring seals. The insulating cap is formed with the appropriate electrical terminals which connect internally of the housing with contacts on the sensor element. Assembly of the device is completed by deforming the housing around the periphery of the cap to hold the cap in place. Depending upon the intended use of the sensing device, the housing can be formed—for example—with an exterior thread and an integral hexagonal portion enabling the device to be screwed into a threaded aperture, or with a smooth exterior surface terminating in a shoulder so that the device can be pushed into an aperture to a depth governed by the shoulder, the aperture often carrying a grommet to ensure an efficient seal.

Sensing devices constructed in this manner are expensive, primarily because of the relatively high cost of turned brass parts but also because of the time-consuming assembly procedure. In performance, moreover, this type of device has important disadvantages. Thus, as the temperature sensor element is enclosed within a brass housing, the thermal response time is necessarily slow. Attempts have been made to alleviate this difficulty by using aluminum rather than brass housings, but without expensive anodising techniques the aluminum is not sufficiently resistant to corrosion. In general the difficulty is dealt with by increasing the sensitivity of the sensor element to compensate for the time lag, but this of course increases the cost of the device. A further important disadvantage lies in the fact that a brass housing—particularly if formed as is customary with a hexagonal nut portion for screwing the device into a threaded aperture—represents a significant heat sink drawing heat from the sensor element. The temperature actually sensed is therefore not that of the chamber in which the sensor element is placed but is rather an effective temperature lying between the actual temperature and the exterior temperature to which the brass housing is subjected.

A temperature sensor having a moulded plastics body has been proposed and this goes some way to overcoming these difficulties. Reference is directed in this connection to UK Patent Application Ser. No. 2,035,553A which discloses a temperature sensor having an injection moulded plastics body into which the sensor element and terminals are inserted and then secured in place by a sealing compound.

It is an object of this invention to provide a more economic method of manufacturing sensing devices and in particular to reduce the number of manufacturing operations. It is further object to provide a sensing device with an improved performance. It is yet a further object to provide a sensing device which is robust.

Accordingly, the present invention consists, in one aspect, in a method of manufacturing a sensing device adapted for mounting in a chamber wall to sense a parameter within the chamber and to provide at one or more terminals outside the chamber an electrical indication of said parameter, comprising the steps of forming a sub-assembly of one or more terminals with a sensor element including contact surfaces, the or each terminal being disposed in electrical contact with a respective contact surface of the sensor element; and moulding an integral plastics body around a part of the or each terminal and at least a part of the sensor element to secure the or each terminal to the sensor element, the moulding being so arranged that the resultant plastics body is outwardly shaped for engagement within an aperture formed in the chamber wall.

Advantageously, the moulding step comprises injection moulding the plastics body in a mould containing said sub-assembly as an insert.

In a further aspect the present invention consists in a sensing device manufactured in accordance with a method as set out above.

BRIEF DESCRIPTION OF THE DRAWINGS

The invention will now be described by way of example with reference to the accompanying drawings in which:

FIG. 2 is an elevation of a further sensing device according to the invention, FIG. 3 is a section on line 3—3 of FIG. 2.

DESCRIPTION OF THE INVENTION

Figure 1:
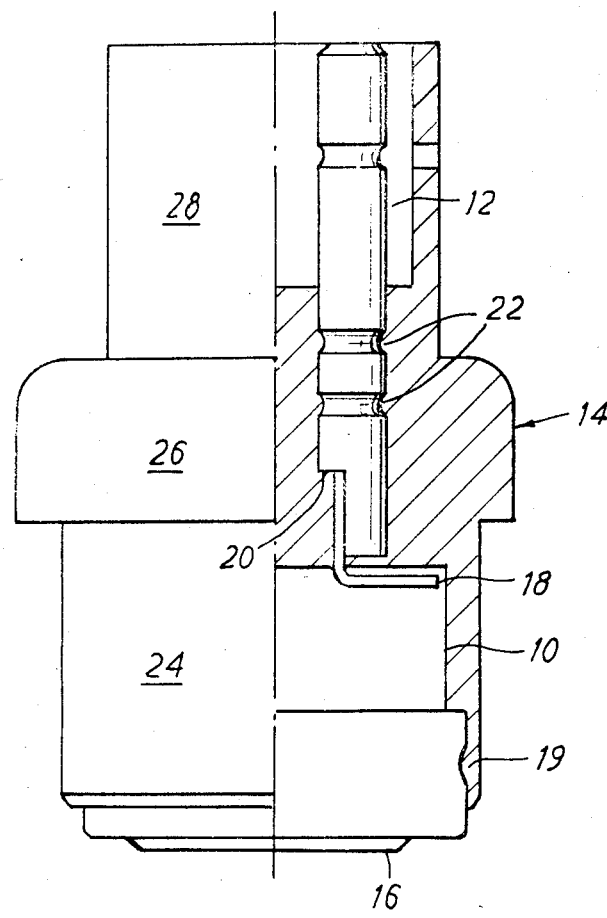
FIG. 1 is an elevation, partly in section, of a sensing device according to the present invention.

The device shown in FIG. 1 comprises a sealed thermostat unit 10, two brass terminals 12 and an injection moulded nylon body 14. The thermostat unit 10 is of conventional construction with a thin metallic cap 16 and two electrical contacts 18 of generally L-shaped form. In its interior (which is not shown in the drawings) the thermostat unit comprises a bimetallic disc which is positioned adjacent the cap 16 and which is arranged at a predetermined temperature to "snap over" from a convex to a concave orientation. This movement is transferred by an actuating pin to a movable contact so as to bring it into (or out of) engagement with a fixed contact. The fixed and movable contacts are connected respectively with the exterior contacts 18. It will be noted that the cap 16 is formed with a circumferential depression 19. The brass terminals are provided each with a cut-away portion 20 and three circumferential grooves 22.

To assemble the illustrated device, the terminals 12 are positioned with their respective cut-away portions 20 in engagement with the exterior contacts 18 of the sensor element and then secured in place. The sub-assembly thus formed is placed in a suitably shaped mould for the injection moulding of the nylon body 14. As shown in the drawing, the body comprises a cylindrical portion 24 which extends around part of the thermostat unit 10, a collar 26 in which are embedded the two terminals 12, and a skirt 28 which protects the exposed ends of the terminals.

In use, the device is mounted within an aperture formed, for example, in the wall of an automobile radiator. The aperture will usually be provided with a self-sealing grommet so that the device is merely pushed into the aperture to a depth defined by the shoulder between the cylindrical portion 24 and the collar 26.

It will be appreciated that as the end cap 16 of the thermostat unit is directly exposed to the environment within the radiator or other chamber, the response time is significantly improved over the prior art devices in which the thermostat unit is contained within a brass housing. Furthermore, the nylon body has a greater resistance to corrosion than does brass.

The manner in which the described sensing device is manufactured leads to economies, first because nylon is a less expensive material than brass and, second, because the operation of placing the terminals and the thermostat unit in a mould and injection moulding the nylon body around them is considerably simpler and less time consuming than the conventional constructional methods. The act of moulding the plastics body around the other parts of the device firmly bonds those parts together, particularly as the moulded body penetrates into the grooves 22 of the terminals and into the circumferential depression 19 formed in the cap of the sensor element to form an interlocking engagement. The resulting construction is extremely robust. It should be noted that all that is required of the bond between the terminals 12 and the respective contacts 18 is electrical continuity, all the necessary mechanical strength is provided by the plastics body.

To enable electrical connection to be made to the device a suitable socket is engaged with the projecting ends of the terminals, the socket preferably being a complementary fit with the device and particularly with the skirt 28. It will be understood that the terminals and the skirt 28 can be modified to meet any standard orientation of sockets or to satisfy any particular requirement. In some cases, the terminals may be left exposed with the skirt 28 omitted.

In FIGS. 2 and 3 there is shown a different sensing device according to this invention. The function of this device is to provide a measure of temperature and for this purpose it includes a NTC pill 30 having upper and lower contact surfaces 32 and 34 respectively. The pill is positioned at the bottom of a copper probe 36 in the form of a hollow cylinder closed at its lower end with the lower contact surface 34 of the pill making electrical contact with the probe 36. A compression spring 38 serves to hold the pill 30 in place, this spring engaging at its upper end a shoulder 40 cut into a flat brass terminal 42. This terminal has a shaped upper portion 44 in the form of a contact blade together with a central, circular aperture 46. The spring 38 is in electrical contact with the upper contact surface 32 of the pill 30 and a mylar sleeve 48 is interposed between the spring and the probe to serve as an insulator. In the open end of the probe 36 there is located a nylon bush or plug 50 into which the brass terminal is forced during assembly—as will be described hereinafter. A shaped copper earth strap 52 is secured to the probe 36 with its ends extending radially outward.

Surrounding the upper part of the probe 36 and the lower part of the terminal 42 is an injection moulded nylon body 54. The body is formed with a hexagonal portion 56 and in its central portion 58 it is externally threaded. The lower portion 60 of the body is tapered to facilitate location of the sensing device in an aperture.

The method of assembly of the described sensing device is as follows. The pill 30 and the spring 38 are positioned within the mylar sleeve 48 which is then located inside the probe 36. The terminal 42 is engaged within the plug 50 and the plug is then forced into the open end of the probe. To facilitate subsequent handling of this sub-assembly, the probe 36 is deformed locally in the region of the plug 42 (this, for reasons of clarity, not being shown in the drawings) to prevent accidental disassembly.

The sub-assembly is tested electrically and then positioned in a suitable mould for the injection moulding of the nylon body. The dimensions of the body are arranged so that the ends of the earth strap 44, 52 terminate at the outside diameter of the threaded body portion 58.

In use, the sensing device is screwed into a threaded aperture in an engine block. For this purpose, a spanner can be applied to the hexagonal portion 56. As the device is screwed into the aperture, the thread of the engine block cuts into the earth strap 52 thus ensuring a good electrical connection between the earth strap and the block.

In operation, heat is transferred through the probe 36 to the pill 30 whose resistance varies with temperature. The current passing through terminal 42, spring 38, NTC pill 30, probe 36 and earth strap 52 to the block will accordingly vary with temperature and can be used to drive a meter acting as a temperature gauge, to operate a warning light or, with additional circuitry, to provide a switched output.

As with the embodiment described previously, the method of manufacture according to this invention offers significant economies over the conventional method of construction in which the NTC pill, spring and insulating sleeve are located in a brass housing shaped outwardly to provide a threaded portion and a hexagonal portion, the housing being then closed with an insulating cap having the terminal positioned therein. Furthermore, since in the device according to this invention the probe is separate from the body, the probe can be made of relatively thin copper so improving the response time of the device. A yet further advantage of the device according to this invention lies in the fact that through the nylon body, the NTC pill is to a large extent thermally insulated from the environment outside the chamber. Accordingly, heat is lost from the NTC pill to the exterior at a considerably slower rate than is the case with prior art devices having brass housings, and the accuracy of temperature measurement is correspondingly increased.

In polarity free applications, or when the device is to be fitted into a non-conducting article, the earth strap can be omitted and the electrical circuit completed through a second terminal similar to that illustrated. The or each terminal can of course take a variety of forms.

Figure 6:
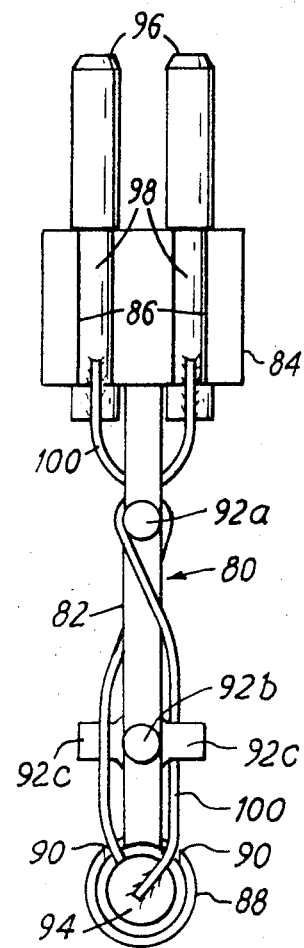
FIG. 6 is a view of a sub-assembly formed during manufacture of the device shown in FIGS. 4 and 5.
Figures 4, 5:
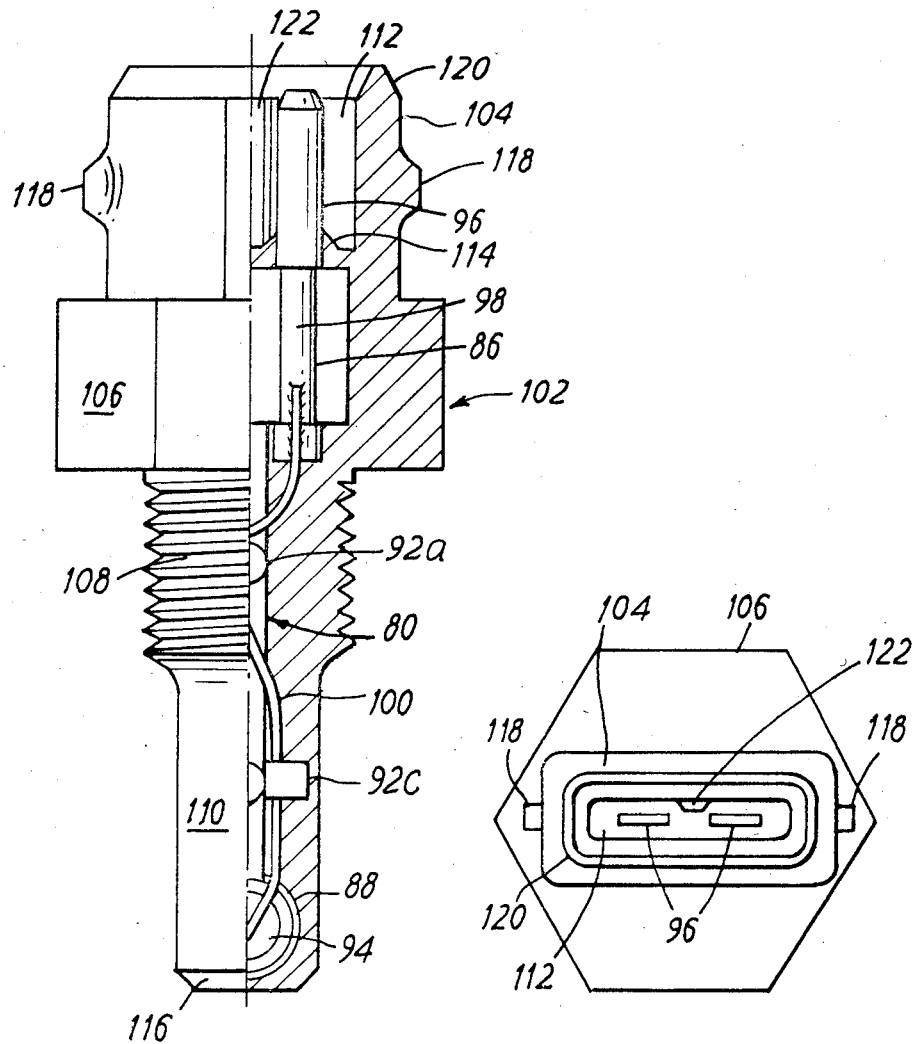
FIG. 4 is an elevation, partly in section, of yet a further sensing device according to the present invention.
FIG. 5 is a plan view of the device of FIG. 4.

The third embodiment of this invention which is illustrated in FIGS. 4, 5 and 6 serves the same function as the device shown in FIGS. 2 and 3, that is to say it offers a temperature dependent resistance across two terminals.

Referring first to FIG. 6, the device includes a moulded plastics assembly jig 80 having a stem 82 of rectangular section. At the top of the stem 82 (as seen in the drawing) there is formed a terminal support block 84 with two parallel slots 86 running in the same direction as the stem. The bottom of the stem terminates in a hollow, cylindrical housing 88 having its cylindrical axis normal to the stem. Small notches 90 are cut into the housing, one each side of the stem 82, to receive wires as described later. In the intermediate portion, the stem is formed with a series of wire directing posts 92. At a location nearer the block 84, two posts 92a extend in opposite directions from the narrow faces of the stem 82. Nearer the housing 88, two further posts 92b extend again in opposite directions from the narrow stem faces and there are an additional two posts 92c which extend at the same location from the broad stem faces.

In assembling the device, an NTC or PTC pill 94 is located in the housing 88 and two flat brass terminals 96—each with an intermediate portion 98 of reduced width—are pushed into the respective slots 86 of the termianl support block 84. The reduced width portions 98 are arranged to be a tight push fit in the slots 88. Wires 100 are taken from the opposing contact faces of the pill 94, through respective notches 90 in the housing and around posts 96a, 96b and 96c the lower ends of the corresponding terminals.

The completed sub-assembly illustrated in FIG. 6 is then placed in a mould for the injection moulding of a plastics body as shown in FIGS. 4 and 5. In the preferred example, the body is moulded in Nylon 66 with 30% glass filler; the jig being of Nylon 6.

Referring to FIG. 4, the body 102 comprises an upper skirt portion 104 of hollow, generally rectangular form; a hexaganol nut portion 106; a cylindrical, outwardly screw threaded portion 108 and a smooth, cylindrical probe portion 110. It will be seen that the body 102 as a whole encapsulates the pill 94, the jig 80 and the wires 100, with the terminals 96 projecting from the body into a terminal cavity 112 shielded by the skirt portion 104. At the floor of the terminal cavity 112 the skirt portion 104 covers the upper surface of the jig and incorporates buttresses 114, one around each terminal. At the other end of the device, the probe body portion 110 terminates in a chamfered end plate 116 and it will be seen that both this end plate and the cylindrical part of the probe around the pill 94 are relatively thin enabling the pill to come rapidly to the temperature of the chamber into which the device projects in use.

As shown particularly in FIG. 5, the body 102 is adapted to receive a socket making electrical connection to the device. The skirt portion 104 includes two radially opposed lugs 118 intended to be a snap fit into complementary formations in the socket. To facilitate location of the socket, the upper edge of the skirt portion is tapered in thickness at 120 and to prevent incorrect positioning of the socket, the skirt portion includes an upright ridge 122 projecting into the terminal cavity 112. This ridge mates with complementary slot in the socket, provided that the socket is correctly orientated.

As with the previous embodiments, the described method of manufacture is economic both in terms of the number of manufacturing operations required to be performed and in the materials used. The resulting device is extremely robust and resistant to corrosion and has the increased performance that is provided by thermal insulation from the supporting chamber wall, as described in the introduction to this specification. It should be apparent from the description of this embodiment that although the new manufacturing method is extremely simple it is nevertheless able to provide a variety of both terminal and mounting configurations to meet particular applications. Other variations will suggest themselves to those skilled in the art.

This invention has been described by way of examples only and a great variety of modifications are possible without departing from the scope of the invention as defined in the appended claims. Thus the body of the device can be formed of plastics materials other than nylon, although for automobile applications it is desirable that the plastics material should be capabe of withstanding a temperature of 150° C. The metal parts in the device can of course be formed of metals other than those specifically mentioned, subject to considerations of electrical conductivity and resistance to corrosion. The terminals may take the form of conductive tracks on a preformed insulating substrate. The sensor element can take other forms than those described above and need not necessarily be temperature dependent; the same manufacturing technique could for example be applied to oil pressure sensors.

The primary application of this invention is felt to lie in the automobile field but it is likely that many other applications exist where a sensing device is required to be mounted in a chamber wall to sense a parameter within the chamber. In certain applications the chamber in question may be less well defined than is the case with an automobile radiator or engine block and may not be totally bounded by the wall in which the device is to be mounted.

What is claimed is:

1. A method of forming a sensing device which is receivable in an aperture in a wall of a chamber of an internal combustion engine, comprising the steps of forming a subassembly by positioning in a common plastics jig at least one terminal and a sensor element having at least one contact surface thereon and making electrical connection between the or each terminal and the respective contact surface of the sensor element; and integrally moulding a body made of a plastic material around said subassembly including the plastics jig to provide a rugged durable attachment of said at least one terminal to said sensor element, and a durable sealed electrical interconnection of said at least one terminal to said sensor element, said body being formed and configured to be received in said aperture so that said sensor element is in communication with the interior of said chamber for sensing a parameter therein and so that the or each terminal is exposed for electrical connection to circuitry external to said chamber.

2. The sensing device formed by the method of claim 1.

3. A method of forming a sensing device which is receivable in an aperture in an electrically conducting wall of a chamber of an internal combustion engine, comprising the steps of forming a subassembly which includes a snesor element having a projecting conductive earth strap and a contact surface thereon and a termianl disposed in electrical contact with said surface, and integrally moulding a body made of a plastic material around said a subassembly to provide a rugged durable attachemnt of said terminal to said sensor element, and a durable sealed electrical interconnection of said terminal to said sensor element, said body being formed and configured to be received in said aperture so that said sensor element is in communication with the interior of said chamber for sensing a parameter therein, so that said terminal is exposed for electrical connection to circuitry external to said chamber, and so that said earth strap projects from the body to engage and establish electrical connection with the chamber wall.

4. A method as claimed in claim 3, wherein the moulding step is so arranged that the plastics body is outwardly screw threaded in the region of said earth strap whereby screwing of said sensing device into a screw threaded aperture serves to cut into said earth strap so ensuring good electrical connection between the earth strap and the chamber wall.

5. The sensing device formed by the method of claim 3.

6. The sensing device formed by the method of claim 4.

7. A method according to claim 3, wherein the moulding step is so arranged that the or each terminal projects from the plastics body for engagement with a complimentary socket.

8. A method according to claim 7, wherein the moulding step is so arranged that the plastics body includes an integral skirt serving to shield the projecting portions of the or each terminal.

9. A method according to claim 7, wherein the moulding step is so arranged that the plastics body is formed in the region of the projecting terminal or terminals with means serving to prevent incorrect positioning of the socket.

10. A method according to claim 1 wherein the moulding step is so arranged that the or each terminal projects from the plastics body for engagement with a complementary socket.

11. A method according to claim 10, wherein the moulding step is so arranged that the plastics body includes an integral skirt serving to shield the projecting portions of the or each terminal.

12. A method according to claim 10, wherein the moulding step is so arranged that the plastics body is formed in the region of the projecting terminal or terminals with means serving to prevent incorrect positioning of the socket.

* * * * *